Dec. 4, 1956     A. S. VRANA     2,772,480
PELORUS PROTRACTOR
Filed Aug. 16, 1955
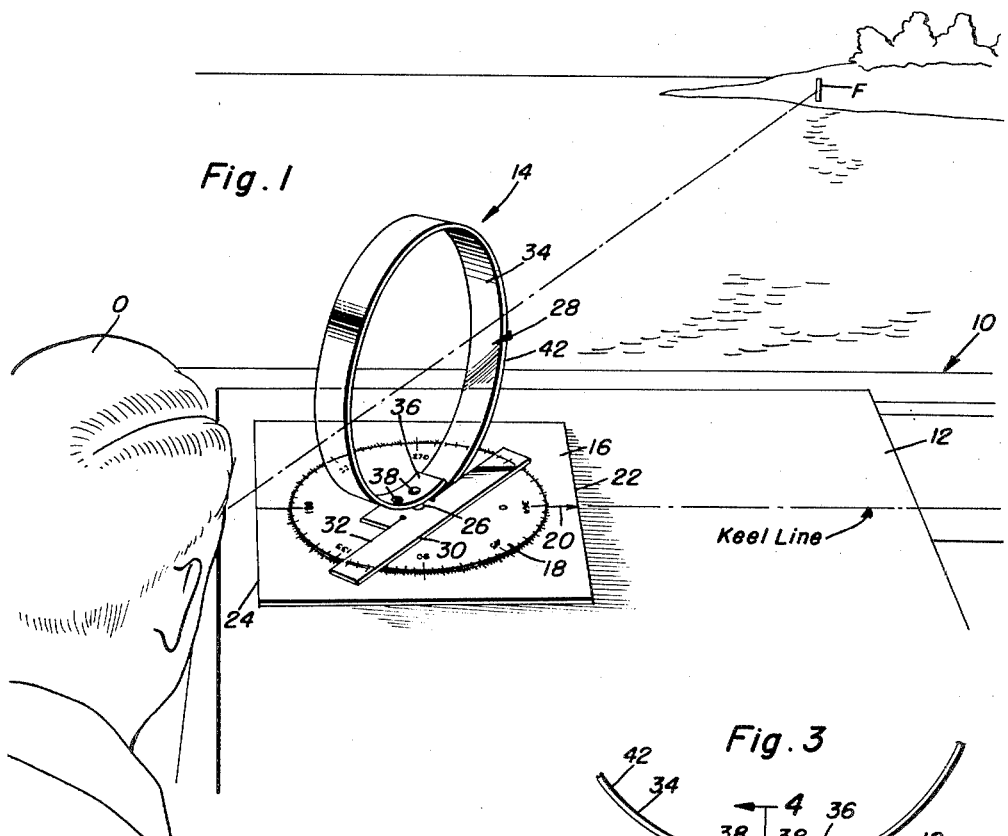
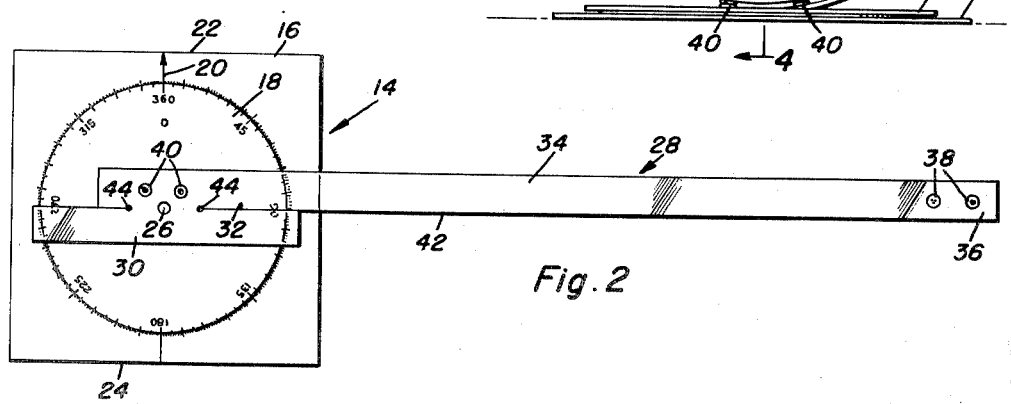
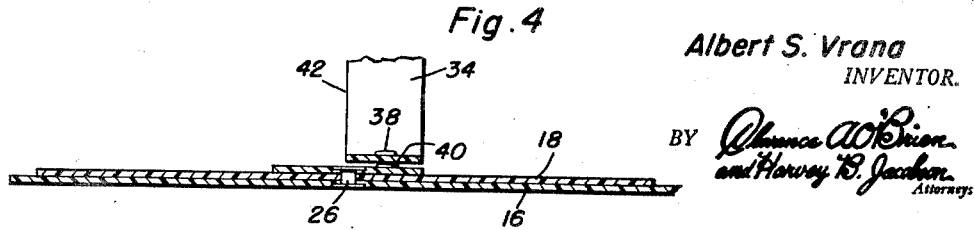
Albert S. Vrana
INVENTOR.

United States Patent Office 2,772,480
Patented Dec. 4, 1956

2,772,480

PELORUS PROTRACTOR

Albert S. Vrana, Northport, N. Y.

Application August 16, 1955, Serial No. 528,641

3 Claims. (Cl. 33—67)

This invention relates generally to navigation instruments and is more particularly concerned with a pelorus loop including means for readily and expeditiously transposing sightings on a fixed point to a charted course whereby the approximate position of a moving body, such as a ship, boat, aircraft may be readily determined.

The primary object of invention in conformance with that set forth above is to provide a support base including a circular scale and aligning indicia thereon, a pivoted pelorus loop normal to the support base having a sighting edge in alignment with a movable indicating edge intersecting the circular scale, said pelorus loop including an attachable free end portion constituting a projection of the indicating edge intersecting the circular scale whereby the base may be readily aligned with a predetermined charted course and the indicating edge will intersect therewith for determining the approximate position of a moving body on said charted course.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the novel pelorus loop in one position of use;

Figure 2 is a top plan view of the novel instrument with the free end portion of the pelorus loop detached and constituting a straight line projection of an indicaiting edge portion of said loop;

Figure 3 is an enlarged fragmentary side elevational view of the novel pelorus loop; and Figure 4 is an enlarged sectional view taken substantially on line 4—4 of Figure 3.

Although the instrument will subsequently be described relative to water borne craft, it is to be understood that the navigation instrument may be likewise utilized on aircraft or any type of movable vehicle or moving body wherein a predetermined course has been charted and an angular sighting may be made from the moving body to a fixed point removed therefrom, as well as being utilized for military purposes in sighting by the artillery, engineers, etc.

Indicated generally at 10 is a portion of a ship or a boat which includes a fixed platform surface 12 including thereon a portion marked as the keel line with which is aligned the pelorus loop 14 in a manner to be subsequently described.

The pelorus loop 14 includes a support base 16 which has marked thereon a circular scale indicated at 18 which is marked from zero to 360°, said scale may be constituted by a separate circular element, see Figure 3, or may be stamped in the upper surface of said support base. The support base includes thereon a straight line index 20 which extends to the opposite edge portions 22 and 24, the index 20 being alignable with the indicated keel line of the craft whereby the base may be readily aligned therewith and an angular sighting may be made relative to said keel line. It is to be understood that the indicated keel line will be in an approximate parallel position or directly on a previously determined charted course line whereby an angular sighting made therefrom with a loop pelorus may be readily transposed on said chart.

A pivot axis element 26 extends through the suitable aperture portion in the support base 16 in the approximate center of a circular scale 18 for pivotally mounting on the support base 16 a pivotal loop pelorus indicated generally at 28. The loop 28 includes a base portion 30 having a straight edge or index edge portion 32 which is in alignment with the center of the scale 18 and extends over the edges thereof for indicating upon said scale the relative angularity between the keel line of the ship and a fixed object upon which a sighting is being taken. The base portion 30 includes integral therewith and disposed on the opposite side of the center 26 of the scale an elongated loop forming element 34 including on a free end portion 36 thereof suitable detachable fastener elements 38 which cooperate with cooperating fastening portions 40 suitably secured in the end of the elongated element 34 adjacent the base portion 30.

Thus the elongated element 34 may be utilized to form the loop as seen in Figure 1, or be permitted to extend over the edge of the base support member 16 whereby the edge portion 42 thereof is in alignment with the indicating edge 32 of the straightedge base portion of the pelorus whereupon when the edge 32 is in alignment with the angle of a sighting, the edge 42 thereof will be in similar alignment and be likewise indicating the same angle. The edge 42 may be defined as the sighting edge of the pelorus when utilized as seen in Figure 1, or be defined as a protractor edge when the apparatus is utilized as seen in Figure 2. The elongated element as well as the entire pelorus may be made of a suitable flexible plastic or any other material of a similar nature, which is transparent or opaque and which permits the ready formation of the loop of Figure 1 without resulting in fatigue of material and rapid deterioration thereof.

Suitable relief holes may be provided at the ending of the edge portion 32 and 42 of the pelorus to prevent the straight edge base portion 30 from fracturing along the aforementioned straight edge lines 32 and 42.

Operation of the device will be most easily understood in consideration of Figure 1, wherein the loop pelorus is formed as seen at 28, the support base 16 is aligned with a keel line by means of the index line 20 whereupon a sight is taken by the operator on the fixed object F along the edge 42 of the loop, the circular loop permits a sighting along the edge even though the boat, ship or aircraft is pitching inasmuch as it will provide a substantial sighting edge above and below a horizontal plane, and inasmuch as the loop is transparent the operator O may look therethrough and more readily be aided in taking a sighting upon the object F. After a sighting has been taken, the elongated element 34 may be unsnapped and assume the position as seen in Figure 2 whereafter the index line 20 may be placed in alignment with the predetermined charted course on a navigation chart whereafter a line may be struck along the edge 42 of the pelorus, said edge serving as a protractor arm and the elongated projection of such line on a navigation chart will intersect with the charted course thereon and the approximate position of the ship, boat, etc., may be readily determined relative to the charted course.

Various positional directional terms, such as, "front," "rear," "top," etc., are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A position locating device comprising a support base including a circular scale thereon from 0 through 360°, said base including a straight line index thereon extending diametrically through the center of the circular scale to opposite edge portions of said base for permitting said base to be aligned with a reference line representing a known direction on a chart, a pivot axis element at the center of said circular scale, and a pivotal loop pelorus including a circular element pivotally supported on the pivot axis element normal to said support base, said pelorus loop including a side edge portion for alignment with a fixed visible point angularly removed from the moving body upon which a sighting may be made with said pelorus loop, said pelorus loop further including a straight edge base portion intersecting the circular scale and parallel with the support base and constituting a straight edge linear projection of the line of sight contained in a vertical plane extending through the side edge portion of said loop and the base portion of said loop.

2. A navigation device as set forth in claim 1 wherein said pelorus loop includes an elongated element having a free end portion removably secured at the base portion of said loop, said free end portion extendable beyond the edge of the support base and constituting a straight line projection of the line of sight contained in the same plane as the base portion of said loop.

3. A position locating device as set forth in claim 2 wherein said pelorus loop is constructed of a flexible transparent material.

References Cited in the file of this patent

UNITED STATES PATENTS

| 961,862 | Huntington | June 21, 1910 |
| 1,569,380 | Leonard | Jan. 12, 1926 |

FOREIGN PATENTS

| 5,709 | Great Britain | Mar. 9, 1906 |